United States Patent [19]

Molstad

[11] Patent Number: 5,243,472
[45] Date of Patent: Sep. 7, 1993

[54] SERIES RESONANT AC ERASE HEAD DRIVE CIRCUIT

[75] Inventor: Richard W. Molstad, St. Paul, Minn.

[73] Assignee: Minnesota Mining and Manufacturing Company, St. Paul, Minn.

[21] Appl. No.: 751,744

[22] Filed: Aug. 29, 1991

[51] Int. Cl.⁵ .................................................. G11B 5/03
[52] U.S. Cl. ........................................ 360/66; 360/67
[58] Field of Search .................................. 360/66, 67

[56] References Cited

U.S. PATENT DOCUMENTS

| | | | |
|---|---|---|---|
| 4,466,027 | 8/1984 | Howell et al. | 360/66 |
| 4,647,994 | 3/1987 | Irwin et al. | 360/85 |
| 5,070,416 | 12/1991 | Eguchi | 360/66 |

*Primary Examiner*—Paul Gensler
*Attorney, Agent, or Firm*—Gary L. Griswold; Walter N. Kirn; William B. Barte

[57] ABSTRACT

A series resonant AC erase head drive circuit apparatus for use with a miniaturized cartridge-type tape drive includes apparatus for generating a non-overlapping pulse wave forms and for driving switches, power switches and a voltage controlled DC current source. The pulse form generating and power switch driving apparatus includes a clock frequency input coupled to an externally supplied clock frequency signal and an enable input coupled to an externally supplied enable signal, and includes a plurality of power switch driving outputs. The power switch driving outputs provide a plurality of power switch control signals which include a non-overlapping interval. Power switches are coupled to the pulse form generating and power switch driving apparatus for switching power to the erase head in an AC fashion in response to the plurality of power switch control signals so as to allow current to flow through the erase head in a first direction for a first time interval, in a second, opposite direction for a second time interval and so as to prevent current from flowing through the erase head during the non-overlapping interval. The power switching apparatus comprises a series resonant H bridge circuit. Apparatus for providing a voltage controlled DC current source is coupled to the power switching apparatus. The erase head drive circuit is capable of operating at clock frequencies greater than 3.6 MHz.

20 Claims, 3 Drawing Sheets

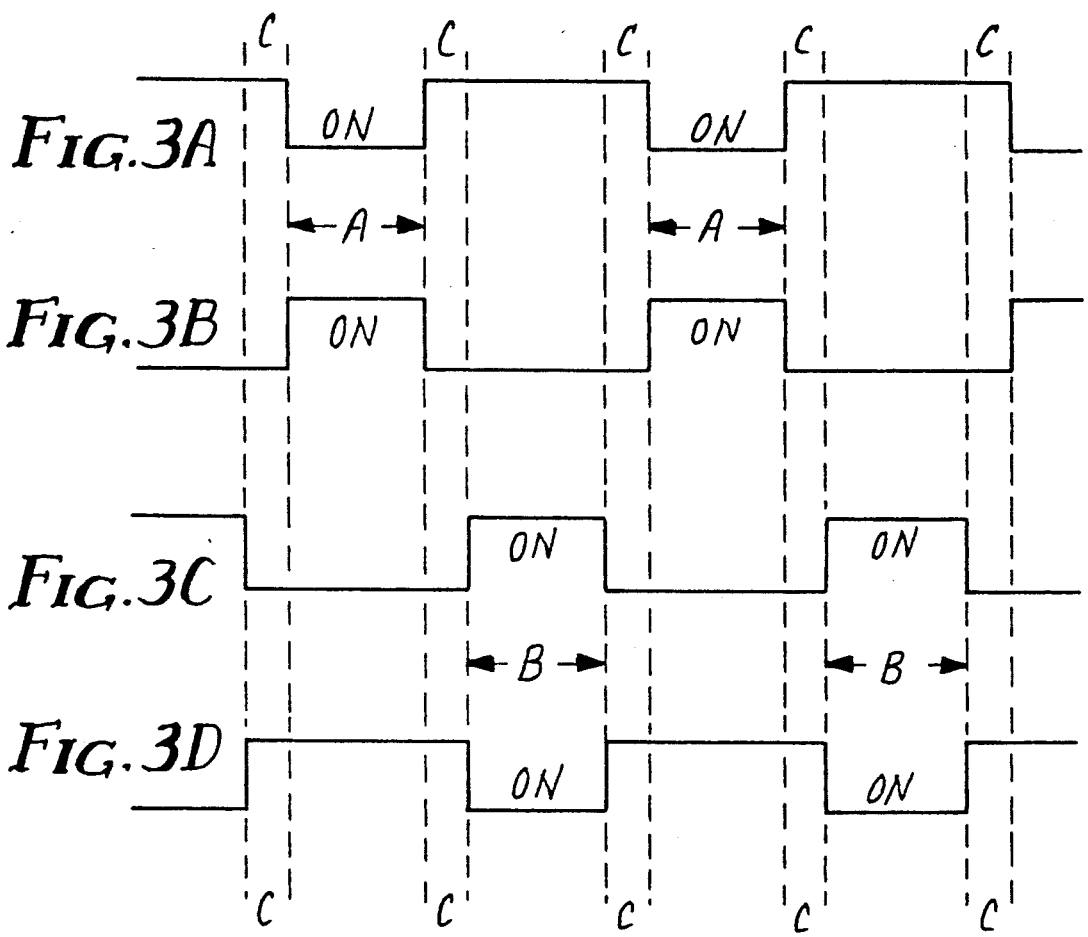

SERIES RESONANT AC ERASE HEAD DRIVE CIRCUIT

BACKGROUND OF THE INVENTION

1. Field Of The Invention

This invention relates generally to the magnetic tape art. More particularly, it is directed to a magnetic tape erasing system in a miniaturized cartridge-type tape drive which erases a tape utilizing a series resonant AC erase head drive circuit.

2. Discussion of the Prior Art

The prior art with respect to this invention lies within the miniaturized cartridge-type tape drive art for use with data processors. An example of such a tape drive is described in U.S. Pat. No. 4,647,994 in a patent to Irwin, et al. entitled "Miniaturized Cartridge-Type Drive for Data Processors". Such tape drives typically have a peripherally-enclosing main frame providing an access opening for insertion of a tape cartridge and structurally mounted, pancake-drive motors for tape transport and head-positioning. This construction allows accessing of any of a plurality of adjacent recording tracks on the tape.

The present invention is specifically directed to the erasure of tape media transported on such tape drives. In one U.S. Pat. No. 4,466,027 to Howell et al, entitled "Digital Tape Erasure Conditioning System", a tape erasure conditioning system is disclosed. The Howell patent utilizes alternating current (AC) erasure which provides an erase field that alternated rapidly relative to the movement of the media across the erase head. The erasing circuitry of the Howell patent provided a 3.58 MHz square wave to two erase drive transistors. The inductance of the erase head in parallel with stray capacitance and a resonating capacitor, allows for a resonant circuit to pump the erase head until a self-limiting condition occurs, thereby AC erasing the previously magnetized tape.

There are several limitations of the prior art erase head circuits which are overcome by the present invention. The Howell patent, for example, is difficult to implement for frequencies above about 3.58 MHz. Further, the approach taken by Howell may require the use of a high voltage power supply or transformers. The scheme employed by Howell requires the use of a center tapped winding. This center tapped scheme makes the use of series resonance or AC coupling impossible, as all 3 wires carry DC current. In a center tapped scheme, such as employed by Howell, the only resonance one can employ is parallel resonance in a circuit employing a resonant capacitor in parallel with the coil. Since the erase head includes an inductance component, the use of parallel resonance only makes supplying current into the inductor coil in the erase head more difficult by making the network comprising the erase head and capacitor impedance higher, not lower.

In contrast, the series resonance scheme of the instant invention cancels the erase head inductance with series capacitance. It also features simple and precise voltage control of the AC erase current. The instant invention provides a circuit capable of delivering a significant amount of power to the erase head at a very high frequency of about 7 MHz. The instant invention enables precise control of the AC erase current by employing an easily generated control voltage. Such a control voltage may be generated from a potentiometer or a microprocessor-based system using well known methods.

Currently, there is a need in the cartridge tape field to erase 900 Oe tape which is a replacement for previously used 550 Oe tape. It has been discovered that 900 Oe tape requires about 40% more current to accomplish erasure down to −30 db on a relative db scale. At high frequencies, the erase head drive circuit of the instant invention provides the requisite current and voltage to the erase head in a much easier manner than the center tapped drive circuit of the prior art.

SUMMARY OF THE INVENTION

A series resonant AC erase head drive circuit apparatus for use with a miniaturized cartridge-type tape drive includes apparatus for generating a non-overlapping pulse form, for driving power switches, power switches themselves and a voltage controlled DC current source. The pulse form generating and power switch driving apparatus includes a clock frequency input coupled to an externally supplied clock frequency signal and an enable input coupled to an externally supplied enable signal, and includes a plurality of power switch driving outputs. The power switch driving outputs provide a plurality of power switch control signals which include a non-overlapping interval. Power switches are coupled to the pulse form generating and power switch driving apparatus for switching power to the erase head in an AC fashion in response to the plurality of power switch control signals so as to allow current to flow through the erase head in a first direction for a first time interval, in a second, opposite direction for a second time interval and so as to prevent current from flowing through the erase head during the non-overlapping interval. The power switching apparatus comprises a series resonant H bridge circuit. Apparatus for providing a voltage controlled DC current source is coupled to the power switching apparatus.

In one aspect of the invention the pulse form generating and power switch driving apparatus includes apparatus for providing a clock frequency connected to the clock frequency input, apparatus for providing an enable signal having an input coupled to the external enable signal and having an enable output coupled to the enable input of the clock frequency apparatus, at least one R-S flip-flop apparatus each coupled at a first input to the enable output and at a second input to the clock frequency output, wherein the at least two R-S flip-flop apparatus are structured and arranged to operate so as to provide the power switch control signals which include a non-overlapping interval.

In yet a further aspect of the invention the power switching apparatus includes a first complementary pair of MOSFET devices and a second complementary pair of MOSFET devices, wherein each complementary pair includes an N channel MOSFET device and a P channel MOSFET device.

In yet a further aspect of the invention at least one resonant capacitor is connected in series with the first and second complementary pairs of MOSFET devices and the erase head.

In yet another aspect of the invention, the voltage controlled DC current source apparatus includes an amplifying apparatus coupled at a first input to a control voltage signal, wherein the amplifying apparatus includes an output and a second input, and a transistor apparatus for supplying current having a source, drain and gate, wherein the gate is connected to the amplifying apparatus output and the drain is connected to the switching power apparatus and wherein the amplifying means responds to the control voltage signal by operating the transistor means to control the current supplied to the power switching means.

In yet another aspect of the invention, the amplifying means and the transistor means of voltage controlled DC current source comprise CMOS devices.

It is an object of the invention to provide a series resonant AC erase head circuit which is capable of operation at a clock frequency greater than 3.6 MHz.

It is an object of the invention to provide an erase apparatus wherein overall system efficiency is enhanced by the use of a non-overlapping switch drive in cooperation with an H bridge. This technique minimizes power wasting so-called "crowbar" current in the H bridge. This so-called crowbar current is detrimental for this particular circuit. When both the P and N transistors on one side of the H bridge are conducting, the current by-passes the head altogether and the total supply voltage is sustained across these transistors. This condition causes needless transistor power dissipation and also obscures the linear relationship between AC load current and DC currents through the current regulator.

It is a further object of the invention to provide an AC erase head drive circuit which inherently avoids permanent magnetization of the magnetic materials of the erase head itself.

Other objects, features and advantages of the invention will become apparent through the Description of the Preferred Embodiment, Claims and Drawings herein wherein like numerals refer to like elements.

BRIEF DESCRIPTION OF THE DRAWINGS

The invention will be more clearly understood by reference to the description below taken in conjunction with the accompanying drawings wherein:

FIGS. 3A, 3B, 3C and 3D graphically illustrate waveforms exhibiting the output of the non-overlapping pulse former and switch driver as provided by the invention.

DESCRIPTION OF THE PREFERRED EMBODIMENT

Figure 1:
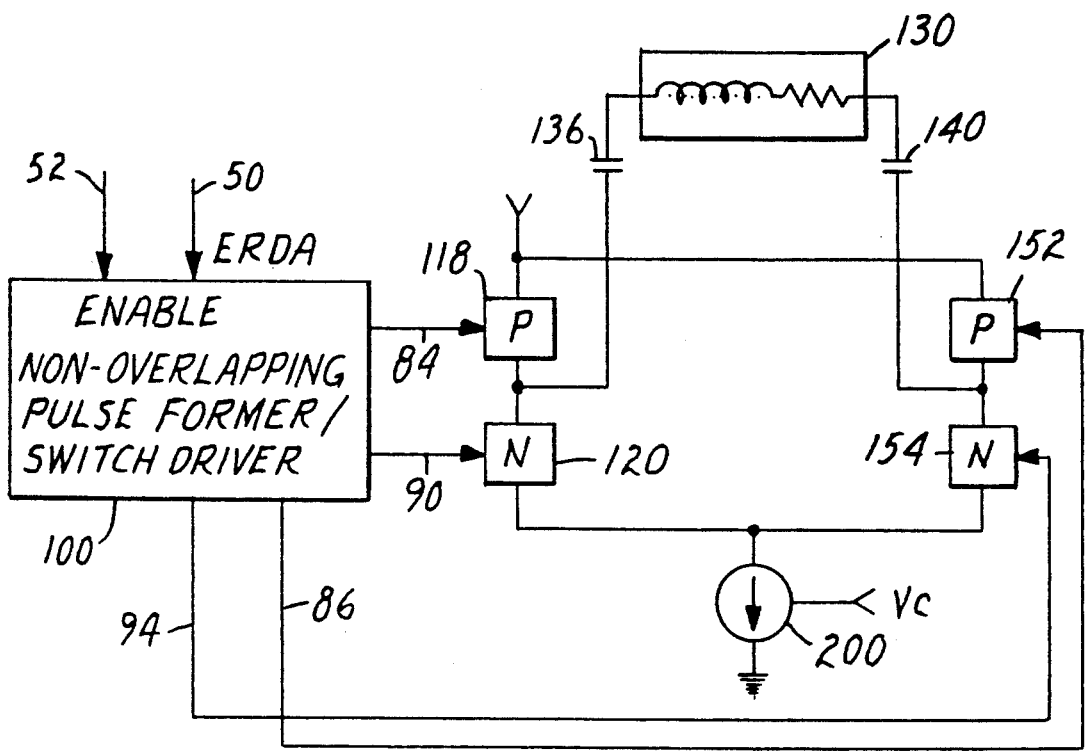
FIG. 1 shows a block diagram of a series resonant AC erase head drive circuit as provided by one aspect of the invention.

Referring now to FIG. 1, a block diagram of one embodiment of a series resonant AC erase head drive circuit as provided by the instant invention is shown. The instant invention will be explained herein by way of example embodiments such as the ones shown in FIG. 1 and FIG. 2. Those skilled in the art having the benefit of this disclosure will appreciate that the examples herein are by way of illustration of the principles of the invention and not by way of limitation. The series resonant AC erase head drive circuit apparatus includes a non-overlapping pulse former and switch driver 100, first, second, third and fourth power switches 118, 120, 152, 154 and voltage controlled DC current source 200. An erase head 130 is shown represented by its internal impedance and a coil.

Figure 2:
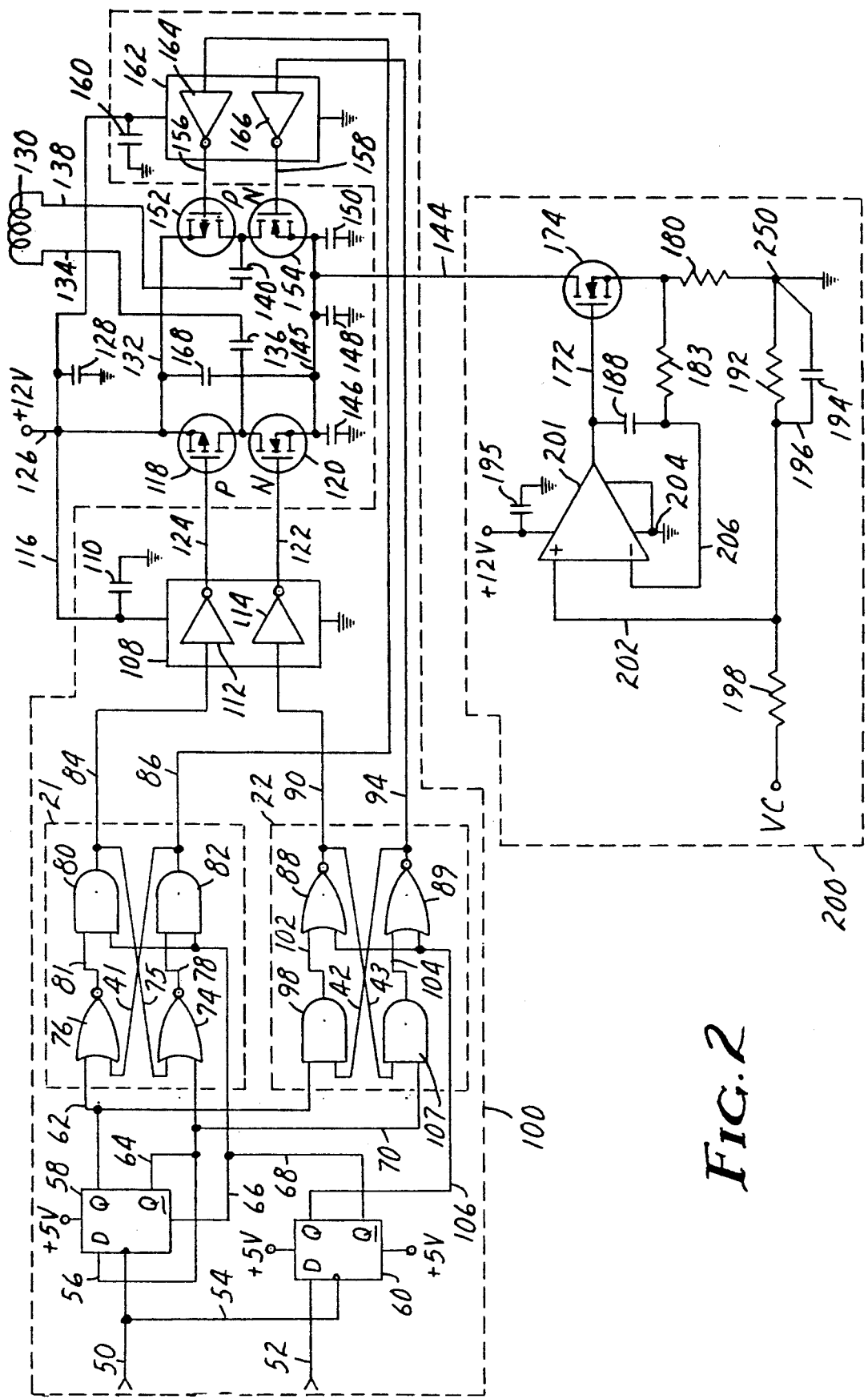
FIG. 2 shows schematically a more detailed circuit diagram of a series resonant AC erase head drive circuit as provided by one aspect of the invention.

Referring now to FIG. 2, a more detailed circuit diagram of a series resonant AC erase head drive circuit constructed in accordance with the principles of the invention is shown. The non-overlapping pulse former and switch driver 100 comprises first and second flip-flop means 58, 60, first and second R-S flip-flop means 21, 22, first and second voltage translating means 108, 162. Also included in the series resonant AC erase head drive circuit are first and second series resonant capacitors 136, 140, erase coil 130 and voltage controlled DC current source 200. In one embodiment of the invention voltage controlled DC current source 200 further comprises an amplifying means 201, a field effect transistor means 174, first through fourth resistance means 183, 180, 192 and 198, and first through third capacitance means 188, 194 and 195.

Now referring in particular to the non-overlapping pulse former and switch driver 100, a first input line 50 designated ERDA is connected to first and second flip-flops 58, 60 at their clock inputs. The first and second flip-flops 58, 60 may advantageously be D-type flip-flops or equivalent devices. The first and second flip-flops 58, 60 each have first and second outputs here designated Q and not Q. The first input 50 designated ERDA may advantageously be a 14 MHz clock input, although the invention is not so limited to using clock inputs at this speed. A second input 52 designated ENABLE is connected to a first input of the second flip-flop 60.

The first R-S flip-flop means 21 further comprises first and second NOR gates 76, 74 and first and second AND gates 80, 82. The second R-S flip-flop means circuit 22 further comprises third and fourth AND gates 98, 100 and third and fourth NOR gates 88, 89. Each of the gates has at least two inputs and at least one output. The Q output of the first flip-flop 58 is coupled by line 62 to a first input of the first NOR gate 76 and the third AND gate 98. The not Q output of the first flip-flop 58 is connected by line 64 to a first input of the second NOR gate 74 and a first input of the fourth AND gate 107 through line 70 and fed back to the D input of the first flip-flop 58 through line 56 . The Q output of the second flip-flop 60 is connected by line 106 to the first inputs of the third and fourth NOR gates 88, 89. Line 68 couples the not Q output to line 66 and provides an ENABLE signal to the first flip-flop 58 through line 66 and to first and second inputs of the first and second AND gates 80, 82.

Still referring to the first R-S flip-flop circuit 21, the first NOR gate 76 provides a signal on line 81 to the second input of AND gate 80. The first AND gate 80 outputs a signal 84 which is fed back on line 75 to the second input of the second NOR gate 74. The second NOR gate 74 outputs a signal 78 to the second input of AND gate 82. Similarly, the second AND gate 82 provides a signal 86 which is fed back on line 41 to a second input of the first NOR gate 76. The third NOR gate 88 outputs a signal 90 which is fed into the second input of the fourth AND gate 107 on line 43. The fourth AND gate 107 outputs a signal on line 104 which is coupled to the second input of the fourth NOR gate 89 which also has an output 94 which is fed back on line 42 to the second input of the third AND gate 98. The output 84 of the first AND gate 80 is coupled to a first input of the first level translator 108. The output 90 of the third NOR gate 88 is coupled to a second input of the first level translator 108. The output 86 of the second AND gate is coupled to the first input of the second level translator 162 and the output 94 of the fourth NOR gate is coupled to the second input of the second level translator 162. The first level translator 108 further comprises first and second amplifying means 112, 114. Similarly the second level translator 162 has first and second amplifying means 164, 166. The first and second amplifying means in each of the level translators 108, 162, are coupled to the outputs 84, 90, 86, 94 of the R-S flip-flop means.

The first level translator 108 has first and second outputs 124, 122 which are coupled to the gates of power switches 118, 120 respectively. Similarly, the second level translating means 162 has first and second outputs 156, 158 coupled to the gates of the third and fourth power switches 152, 154 respectively. The power switches 118, 120, 152, 154 are structured and arranged with the first and second series resonant capacitors 136, 140 and the coil in the erase head 130 to form an "H" bridge type circuit.

Each of the power switches in this example embodiment of the invention may advantageously comprise MOSFETs embedded in a very large scale integrated circuit. Each of the power switches, in this example, include a gate, a source, and a drain. The drains of the first and second power switches are connected through the first series resonant capacitor 136 to erase coil 130 by line 134. Line 138 is connected to a first terminal of the second series resonant capacitor 140 which is connected on the second terminal to the drains of the third and fourth power switches 152, 154. The gates of the third and fourth power switches 152, 154 are coupled to the outputs 156, 158 of the second level translator 162. A bypass capacitor 168 is advantageously connected at a first terminal to a line 132 at the source of the first power switch 118. The second terminal of capacitor 168 is connected to line 145 at the source of the second power switch 120. First, second and third filtering capacitors 110, 128, 160 may be coupled to a power line which supplies power from an external source to the level translators. In one embodiment of the invention a 12 volt supply is provided on line 126 to the source of the first power switch 118 and the third power switch 152.

Now referring in particular to the voltage controlled DC current source 200, the amplifying means 201 includes a non-inverting input at line 202 and an inverting input at line 206. The amplifier includes an output at line 172 which is fed back through capacitor 188 and line 206 to the inverting input. The output 172 is also coupled to the transistor means 174. Transistor means 174 may advantageously comprise a MOSFET having a gate, drain and source where the gate is connected to the line 172. The drain of transistor means 174 is also coupled by means of line 144 to line 145 which is in turn coupled to the sources of the second and fourth power switches 120, 154. The source of transistor means 174 is coupled through the first resistance means 183 to line 206 and through the second resistance means 180 connected in parallel to a common point 250. The common point 250 is connected to a first side of a filter comprising a third resistance means 192 and capacitor 194 which is connected at node 251 to a first terminal of the fourth resistance means 198. The second terminal of the fourth resistance means 198 is connected to a control voltage from an external voltage source which is not shown. In one embodiment of the invention the control voltage source may be a digital to analog converter which is controlled, in turn, by a microprocessor in a well known manner. Precise current limiting is necessary because at high power, that is, greater than about 1 watt, the erase head's temperature rises considerably, causing the erase head's internal real impedance to drop substantially. If a current limiter were not present, the erase current would thermally run away.

In one example embodiment of the invention, the entire erase driver apparatus was constructed of CMOS components. The power switches 118, 120, 152, 154 forming the heart of the H bridge circuit included four high speed complementary MOSFETs. In the example circuit constructed, the H bridge exhibited a DC output resistance of about 6 ohms. The power switching means advantageously included a first complementary pair of MOSFET devices and a second complementary pair of MOSFET devices, wherein each complementary pair includes an N channel MOSFET device and a P channel MOSFET device. The power switches were embedded in TO-89 packages, each of which dissipates about 0.44 Watts when surface mounted. The erase coil head included a four-turn coil capable of sustaining about 2.2 Amp-turns of current, which was adequate to erase a 900 Oe tape media to $-30$ db on a relative db scale.

Having described in detail the elements which comprise an example embodiment of the invention, it will now be most helpful to the understanding of the invention to describe the operation of the invention. Referring now to FIGS. 3A-3D, waveforms as generated by the non-overlapping pulse former/and switch driver 100 are shown. The signal shown in FIGS. 3A-3D correspond to a clock frequency of 6.975 MHz in one example embodiment of the invention. In operation, the first flip-flop means provides a divide by two operation on the incoming ERDA signal which is, in one example of the invention, a 14 MHz square wave. The R-S flip-flop configured gates 21, 22 operate to provide the non-overlapping waveforms which drive the power switches 118, 120, 152, and 154. The first power switch 118 operates with the fourth power switch 154 to provide a current in a first direction in this case left to right through the erase coil 130. The second and third power switches 120, 152 operate together to provide current in a second, opposite direction through the erase coil 130. The power switches are controlled by the output of the non-overlapping pulse former and switch driver 100 so that the first and fourth power switches are never turned on at the same time as the second and third power switches 120, 152.

FIGS. 3A and 3B refer to the control waveforms at the gates of the first and fourth power switches respectively. Note that the first and fourth power switches are turned on in the intervals labeled A. Similarly, the second and third power switches 120, and 154 are turned on in the intervals labeled B between graphs of FIG. 3C and FIG. 3D wherein FIG. 3C represents the control signal at the gate of the second power switch and FIG. 3D represents the control signal at the gate of the third power switch 152. At all other times the power switches are turned off. This creates a third interval shown as interval C on the waveform graphs of FIGS. 3A-3D where all power switches are turned off. In this way, there is no overlap area where the first and fourth power switches are turned on at the same time as the second and third power switches.

Those skilled in the art having the benefit of this disclosure will appreciate that using two R-S flip-flops 21,22 to generate the non-overlapping waveforms is only one example embodiment used here to illustrate and not limit the invention. Other circuits may be constructed to function in an equivalent manner. For example, one R-S flip-flop coupled to an inverter may suitably supply both of the non-overlapping waveforms.

Figure 4:
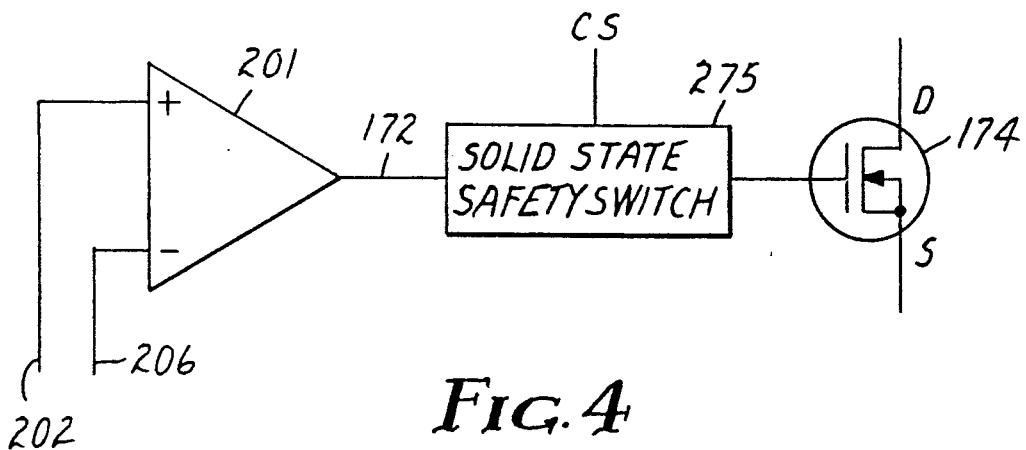
FIG. 4 shows schematically an alternative embodiment of the voltage controlled DC current source as employed in one aspect of the present invention.

Referring now to FIG. 4 a detail of an alternative embodiment of the voltage controlled DC current source 200 is shown. The only change from the circuit shown in FIG. 2 is the addition of a solid state safety switch 275 which is connected between the field effect transistor means 174 and the amplifying means 201. The purpose of the solid state safety switch is to provide an open circuit between the amplifier 201 and the field effect transistor means 174 to prevent current from flowing through transistor means 174 at inappropriate times. If no current flows through transistor 174, the erase circuit of the invention will not provide a current through the erase coil. A control signal CS, which may be applied by a microprocessor, for example, serves to open or close the switch 275. The switch 275 may advantageously be a MOSFET, for example. This is an optional feature and may be used in some embodiments of the invention to safeguard against accidental erasure of data on a streaming tape.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A series resonant AC erase head drive circuit apparatus for use with a miniaturized cartridge-type tape drive having an erase head comprising:
   a. means for generating a non-overlapping pulse form and for driving power switches wherein the pulse form generating and power switch driving means includes a clock frequency input coupled to an externally supplied clock frequency signal and an enable input coupled to an externally supplied enable signal, and wherein the pulse form generating and power switch driving means includes a plurality of power switch driving outputs, wherein the power switch driving outputs provide a plurality of power switch control signals which include a non-overlapping interval; and
   b. means, coupled to the pulse form generating and power switch driving means, for switching power to the erase head in an AC fashion in response to the plurality of power switch control signals so as to allow current to flow through the erase head in a first direction for a first time interval, in a second, opposite, direction for a second time interval, wherein the power switch control signals operate so as to prevent current from flowing through the erase head during the non-overlapping interval, and wherein the power switching means comprises a series resonant H bridge circuit.

2. The apparatus of claim 1 further comprising a means for providing a voltage controlled DC current source coupled to the power switching means.

3. The apparatus of claim 2 wherein the pulse form generating and power switch driving means further comprises:
   a. means for providing a clock frequency connected to the clock frequency input;
   b. means for providing an enable signal having an input coupled to the external enable signal and having an enable output coupled to the enable input of the clock frequency means;
   c. at least one R-S flip-flop means coupled at a first input to the enable output and at a second input to the clock frequency output, wherein the at least one R-S flip-flop means is structured and arranged to operate so as to provide the power switch control signals which include a non-overlapping interval.

4. The apparatus of claim 3 wherein the power switching means comprises a first complementary pair of MOSFET devices and a second complementary pair of MOSFET devices, wherein each complementary pair includes an N channel MOSFET device and a P channel MOSFET device.

5. The apparatus of claim 4 wherein at least one resonant capacitor is connected in series with the first and second complementary pairs of MOSFET devices and the erase head.

6. The apparatus of claim 4 wherein the voltage controlled DC current source means comprises:
   a. an amplifying means coupled at a first input to a control voltage signal, wherein the amplifying means includes an output and a second input; and
   b. a transistor means for sinking current having a source, drain and gate, wherein the gate is connected to the amplifying means output and the drain is connected to the switching power means and wherein the amplifying means responds to the control voltage signal by operating the transistor means to control the current supplied to the power switching means.

7. The apparatus of claim 6 wherein the amplifying means and the transistor means of voltage controlled DC current source comprise CMOS devices.

8. The apparatus of claim 6 wherein the voltage controlled DC current source further comprises a solid state safety switch connected between the amplifying means and the transistor means.

9. The apparatus of claim 1 wherein the clocking frequency is greater than 3.6 MHz.

10. A series resonant AC erase head drive circuit apparatus, for use with a miniaturized cartridge-type tape drive having an erase head, comprising:
   a. means for generating a non-overlapping pulse form and for driving power switches wherein the pulse form generating and power switch driving means includes a frequency input coupled to an externally supplied frequency signal and an enable input coupled to an externally supplied enable signal, and wherein the pulse form generating and power switch driving means includes a means for translating the voltage level of the non-overlapping pulse form including a plurality of power switch driving outputs, wherein the power switch driving outputs provide a plurality of power switch control signals which include a non-overlapping interval;
   b. means, coupled to the pulse form generating and power switch driving means, for switching power to the erase head in an AC fashion in response to the plurality of power switch control signals so as to allow current to flow through the erase head in a first direction for a first time interval, in a second, opposite direction for a second time interval and so as to prevent current from flowing through the erase head during the non-overlapping interval, and wherein the power switching means comprises a series resonant H bridge circuit; and c. means for providing a voltage controlled DC current source coupled to the power switching means.

11. The apparatus of claim 10 wherein the pulse form generating and power switch driving means further comprises:

a. means for providing a clock frequency connected to the clock frequency input;

b. means for providing an enable signal having an input coupled to the external enable signal and having an enable output coupled to the enable input of the clock frequency means;

c. at least one R-S flip-flop means coupled at a first input to the enable output and at a second input to the clock frequency output, wherein the at least one R-S flip-flop means is structured and arranged to operate so as to provide the power switch control signals which include a non-overlapping interval.

12. The apparatus of claim 11 wherein the power switching means comprises a first complementary pair of MOSFET devices and a second complementary pair of MOSFET devices, wherein each complementary pair includes an N channel MOSFET device and a P channel MOSFET device.

13. The apparatus of claim 12 wherein at least one resonant capacitor is connected in series with the first and second complementary pairs of MOSFET devices and the erase head.

14. The apparatus of claim 13 wherein the voltage controlled DC current source means comprises:

a. an amplifying means coupled at a first input to a control voltage signal, wherein the amplifying means includes an output and a second input; and b. a transistor means for sinking current having a source, drain and gate, wherein the gate is connected to the amplifying means output and the drain is connected to the switching power means and wherein the amplifying means responds to the control voltage signal by operating the transistor means to control the current supplied to the power switching means.

15. The apparatus of claim 14 wherein the amplifying means and the transistor means of voltage controlled DC current source comprise CMOS devices.

16. The apparatus of claim 11 wherein the clock frequency is greater than 3.6 MHz.

17. The apparatus of claim 16 wherein the voltage controlled DC current source further comprises a solid state safety switch connected between the amplifying means and the transistor means.

18. A series resonant AC erase head drive circuit apparatus for use with a miniaturized cartridge-type tape drive comprising:

a. means for generating a non-overlapping pulse form and for driving power switches, said generatiang and driving means including (i) means responsive to a clock frequency input externally supplied with a clock frequency signal for providing a clock frequency greater than 3.6 MHz, at a clock frequency output, (ii) means responsive to an enable input externally supplied with an enable signal for providing an enable signal at an enable output, and (iii) at least one R-S flip-flop means coupled at a first input to the enable output and at a second input to the clock frequency output, wherein the at least one R-S flip-flop means is structured and arranged to operate so as to provide a plurality of power switch control signals which include a non-overlapping interval;

b. means, coupled to the pulse form generating and power switch driving means, for switching power to an erase head in an AC fashion in response to the plurality of power switch control signals so as to allow current to flow through the erase head in a first direction for a first time interval, in a second, opposite direction for a second time interval and so as to prevent current from flowing through the erase head during the non-overlapping interval, and wherein the power switching means comprises a series resonant H bridge circuit and include a first complementary pair of MOSFET devices, wherein each complementary pair includes an N channel MOSFET device and a P channel MOSFET device; and c. means for providing a voltage controlled DC current source coupled to the power switching means wherein the voltage controlled DC current source means comprises an amplifying means coupled at a first input to a control voltage signal, wherein the amplifying means includes an output and a second input, and a transistor means for sinking current having a source, drain and gate, wherein the gate is connected to the amplifying means output and the drain is connected to the switching power means and wherein the amplifying means responds to the control voltage signal by operating the transistor means to control the current supplied to the power switching means.

19. The apparatus of claim 18 wherein a first resonant capacitor and a second resonant capacitor are connected in series with the first and second complementary pairs of MOSFET devices and the erase head.

20. The apparatus of claim 18 wherein the amplifying means and the transistor means of voltage controlled DC current source comprise CMOS devices.

* * * * *